United States Patent Office 3,475,425
Patented Oct. 28, 1969

3,475,425
2,7-DIMORPHOLINO-4-TERTIARYAMINO-6-HETEROARYL-PTERIDINES
Josef Roch, Biberach an der Riss, Germany, assignor to Boehringer Ingelheim G.m.b.H., Ingelheim am Rhein, Germany, a corporation of Germany
No Drawing. Filed Apr. 12, 1966, Ser. No. 541,962
Claims priority, application Germany, Apr. 15, 1965, T 28,408
Int. Cl. C07d 87/28, 87/46, 51/46
U.S. Cl. 260—246    5 Claims

ABSTRACT OF THE DISCLOSURE

The compounds are 2,7-dimorpholino-4-amino-6-aromatic heterocyclic-substituted-pteridines, useful as coronary dilators in warm-blooded animals.

This invention relates to novel pteridine derivatives, as well as to various methods of preparing these compounds.

More particularly, the present invention relates to a novel class of pteridine substitution products of the formula

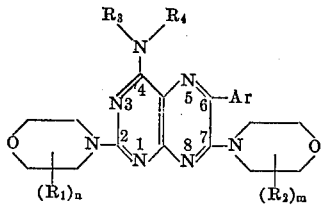

(I)

wherein
$R_1$ and $R_2$, which may be identical to or different from each other, are lower alkyl, especially methyl,
$n$ and $m$, which may be identical to or different from each other, are integers from 0 to 4, inclusive, preferably 0 to 2,
$R_3$ is lower alkyl, benzyl or hydroxy-substituted lower alkyl,
$R_4$ is hydroxy-substituted lower alkyl, and Ar is a 5- to 6-membered unsaturated aromatic heterocycle attached to the pteridine nucleus through a ring carbon atom, especially thienyl, chlorofuryl or pyridyl, or

where $R_5$ is halogen, nitro, lower alkyl, lower alkoxy or amino, especially chlorine, nitro, methyl, methoxy or amino.

The preferred embodiments of the Ar substituent are theinyl, chloro-furyl and pyridyl.

The compounds according to the present invention may be prepared by a number of different methods which involve well-known chemical principles; however, among these the following are especially convenient and efficient:

METHOD A

By reacting a pteridine substitution product of the formula

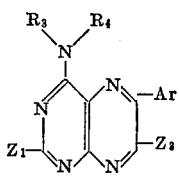

(II)

wherein Ar, $R_3$ and $R_4$ have the same meanings as in formula I, and $Z_1$ and $Z_3$ are halogen atoms, substituted hydroxyl groups or substituted mercapto groups, with a morpholine compound of the formula

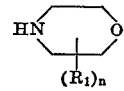

(IIIa)

or

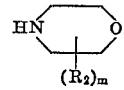

(IIIb)

wherein $R_1$, $R_2$, $m$ and $n$ have the same meanings as in Formula I.

METHOD B

By reacting a pteridine substitution product of the formula

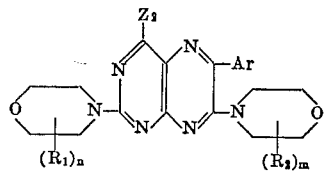

(IV)

wherein $R_1$, $R_2$, Ar, $n$ and $m$ have the same meanings as in Formula I, and $Z_2$ is a halogen atom, a substituted hydroxyl group or a substituted mercapto group, with a secondary amine of the formula

(V)

wherein $R_3$ and $R_4$ have the same meanings as in Formula I.

The reactions of methods A and B above are most advantageously performed at a temperature between room temperature and 220° C., and in the presence of an inert organic solvent and an acid-binding agent, if necessary. By "acid-binding agent" we mean a compound capable of tying up or neutralizing the hydrogen halide released by the reaction when $Z_1$, $Z_2$ or $Z_3$ in compounds II and IV above are halogen atoms.

The selection of the most effective reaction temperature depends largely upon the nature of substituents $Z_1$, $Z_2$ and $Z_3$ in pteridine compounds II and IV as well as upon the reactivity of the morpholine compound IIIa or IIIb and the secondary amine V. If $Z_1$, $Z_2$ and/or $Z_3$ are halogen atoms, only moderately elevated temperatures are required; on the other hand, if $Z_1$, $Z_2$ and/or $Z_3$ are substituted hydroxyl groups or substituted mercapto groups, the reaction will proceed satisfactorily only at substantially higher temperatures. In those instances where the reaction is sluggish, it may also be advantageous to add an accelerator to the reaction mixture, preferably a copper salt or a salt formed by compound IIIa, IIIb or V with an acid; the reaction may also be accelerated by carrying it out in a closed vessel.

Examples of preferred substituents for substituted hydroxyl or mercapto groups represented by $Z_1$, $Z_2$ and $Z_3$ are lower alkyl, aralkyl or aryl.

Examples of suitable inert organic solvents are acetone, benzene, dioxane and dimethylformamide.

Examples of suitable acid-binding agents are inorganic or tertiary organic bases, such as alkali metal hydroxides, alkali metal carbonates and trialkylamines. However, a stoichiometric excess of the morpholine IIIa or IIIb or the secondary amine V over and above the amount required for reaction with the pteridine derivative or IV may also serve as the acid-binding agent and/or the solvent medium.

If the morpholino substituents in the 2- and 7-positions of Formula I are to be identical, at least two mols of a morpholine compound IIIa or IIIb must be provided per mol of the pteridine compound II in method A. On the other hand, if the morpholino substituents are to be different, they may be introduced in stepwise fashion; thus, if $Z_1$ and $Z_3$ in pteridine compound II are identical, for instance, identical halogen atoms, the pteridine compound II is first reacted with one mol equivalent of morpholine compound IIIa, and the reaction product is then reacted with at least one mol equivalent of morpholine compound IIIb. If $Z_1$ and $Z_3$ in pteridine compound II are different, for instance, if one is a halogen atom and the other is a substituted hydroxyl or mercapto group, the halogen atom will, as a rule, be replaced first.

The pteridine starting compounds II and IV may be prepared by the method described in German Patent No. 1,088,969. For instance, a compound of the Formula II may be prepared by reacting a corresponding 6-aryl-2,4,7-trichloro-pteridine with a secondary amine V; similarly, a compound of the Formula IV may be prepared by reacting a 2,7-dichloro-4-alkylmercapto-6-aryl-pteridine with a morpholine compound IIIa or IIIb.

Accordingly, using the process described in said German patent, the following starting compounds of the Formulas II or IV were prepared:

2,7-dichloro-4-methylethanolamino-6-(p-chlorophenyl)-pteridine, M.P. 164–165° C.;
4-ethanolisopropanolamino-2,7-dichloro-6-(m-tolyl)-pteridine, M.P. 165–166° C.;
2,7-dichloro-4-diisopropanolamino-6-(p-methoxyphenyl)-pteridine, M.P. 152–155° C.;
2,7-dichloro-4-diisopropanolamino-6-(p-tolyl)-pteridine, M.P. 183–185° C.;
4-ethanolisopropanolamino-2,7-dichloro-6-(o-tolyl)-pteridine, M.P. 172–174° C.;
4-ethanolisopropanolamino-2,7-dichloro-6-(2'-thienyl)-pteridine, M.P. 188–190° C.;
2,7-dichloro-4-diisopropanolamina-6-(2'-thienyl)-pteridine, M.P. 194–196° C.

The following examples will further illustrate the present invention and enable others skilled in the art to understand it more completely. It should be understood, however, that the present invention is not limited to the particular examples given below.

EXAMPLE 1

Preparation of 2,7-dimorpholino-4-methylethanolamino-6-(p-chlorophenyl)-pteridine by method A 0.02 mol of 2,7-dichloro-4-methylethanolamino-6-(p-chlorophenyl)-pteridine was admixed with 25 cc. of morpholine, and the mixture was refluxed for thirty minutes. Thereafter, while the reaction mixture was still hot, it was poured into about 500 cc. of water, whereby a precipitate formed. The aqueous mixture was allowed to stand at room temperature for some time, the precipitate was separated by vacuum filtration, and the filter cake was washed with water and dried. The dry product was dissolved in 0.1 N hydrochloric acid and reprecipitated by adding 2 N ammonia to the acid solution. The reprecipitated product was finally recrystallized from methanol. The thus purified reaction product had a melting point of 260–262° C. It was identified to be 4-methylethanolamino-2,7-dimorpholino-6-(p-chlorophenyl)-pteridine of the formula

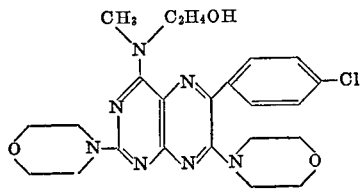

EXAMPLE 2

Preparation of 2,7-dimorpholino-4-ethylethanolamino-6-(p-nitrophenyl)-pteridine by method B 0.005 mol of 2,7-dimorpholino-4-ethylthio-6-(p-nitrophenyl)-pteridine was admixed with 20 cc. of ethylethanolamine and a small amount of ethylethanolamine hydrochloride, and the mixture was refluxed for about fifteen hours. Thereafter, the excess unreacted ethylethanolamine was distilled off, and the residue was taken up in about 200 cc. of water. A precipitate formed, which was separated, recrystallized from a 2:1 mixture of ethylene chloride and cyclohexane, dissolved in 0.1 N hydrochloric acid and reprecipitated with 2 N ammonia. The thus purified product had a melting point of 214–215° C. and was identified to be 2,7-dimorpholino-4-ethylethanolamino-6-(p-nitrophenyl)-pteridine of the formula

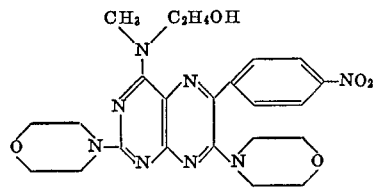

EXAMPLE 3

Using a procedure analogous to that described in Example 1, 2,7-dimorpholino-4-ethanolisopropanolamino-6-(m-tolyl)-pteridine, M.P. 231–233° C., of the formula

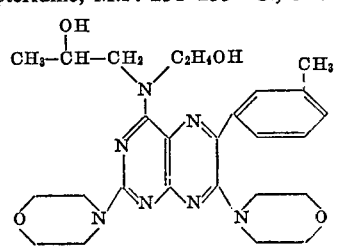

was prepared from 2,7-dichloro-4-ethanolisopropanolamino-6-(m-tolyl)-pteridine and morpholine.

EXAMPLE 4

Using a procedure analogous to that described in Example 1, 2,7-dimopholino-4-diisopropanolamino - 6 - (p-methoxyphenyl)-pteridine, M.P. 165–168° C. of the formula

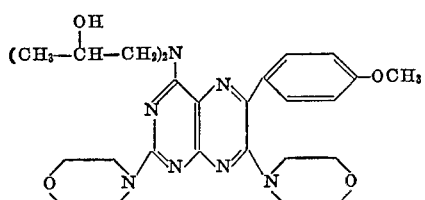

was prepared from 2,7-dichloro-4-diisopropanolamino-6-(p-methoxyphenyl)-pteridine and morpholine.

EXAMPLE 5

Using a procedure analogous to that described in Example 1, 2,7 - dimorpholino-4-diisopropanolamino-6-(5'-chloro-2'-furyl)-pteridine, M.P. 208–211° C. of the formula

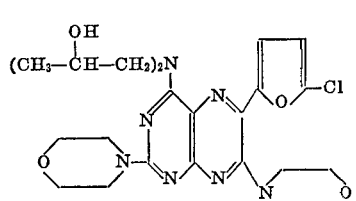

was prepared from 2,7-dichloro-4-diisopropanolamino-6-(5'-chloro-2'-furyl)-pteridine and morpholine.

EXAMPLE 6

Using a procedure analogous to that described in Example 1, 2,7-dimorpholino-4-ethanolpropanolamino-6-(3'-pyridyl)-pteridine of the formula

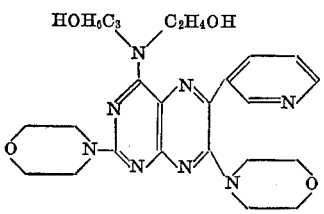

was prepared from 2,7-dichloro-4-ethanolpropanolamino-6-(3'-pyridyl)-pteridine and morpholine.

EXAMPLE 7

Using a procedure analogous to that described in Example 2, 2,7 - dimorpholino - 4 - ethylethanolamino-6-(p-aminophenyl)-pteridine, M.P. 225–226° C., of the formula

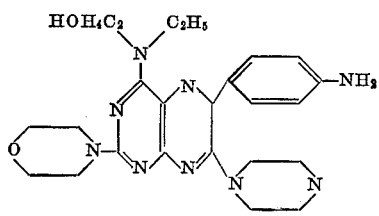

was prepared from 2,7 - dimorpholino - 4 - ethylthio-6-(p-aminophenyl)-pteridine and ethylethanolamine.

EXAMPLE 8

Using a procedure analogous to that described in Example 1, 2,7-dimorpholino - 4 - diisopropanolamino-6-(p-tolyl)-pteridine, M.P. 155–160° C., of the formula

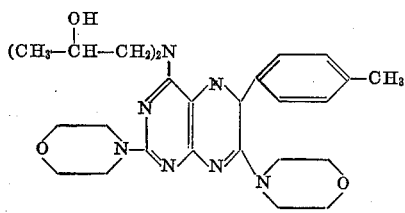

was prepared from 2,7-dichloro-4-diisopropanolamino-6-(p-tolyl) pteridine and morpholine.

EXAMPLE 9

Using a procedure analogous to that described in Example 1, 2,7-dimorpholino-4-ethanolisopropanolamino-6-(o-tolyl)-pteridine, M.P. 210–211° C., for the formula

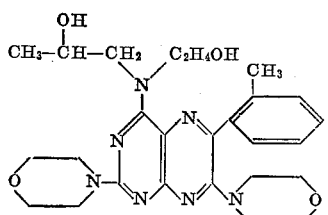

was prepared from 2,7-dichloro - 4 - ethanolisopropanolamino-6-(o-tolyl)-pteridine and morpholine.

EXAMPLE 10

Using a procedure analogous to that described in Example 1, 2,7-dimorpholino-4-ethanolisopropanolamino-6-(2'-thienyl)-pteridine, M.P. 212–214° C., of the formula

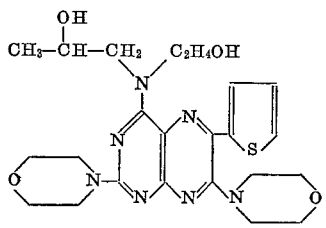

was prepared from 2,7-dichloro - 4 - ethanolisopropanolamino-6-(2'-thienyl)-pteridine and morpholine.

EXAMPLE 11

Using a procedure analogous to that described in Example 1, 2,7 - dimorpholino-4-diisopropanolamino-6-(2'-thienyl)-pteridine, M.P. 180–182° C., of the formula

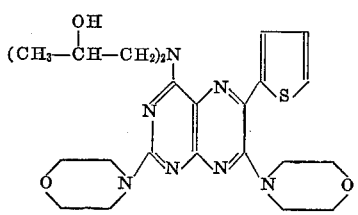

was prepared from 2,7-dichloro-4-diisopropanolamino-6-(2'-thienyl)-pteridine and morpholine.

The compounds according to the present invention, that is, those embraced by Formula I above, have useful pharmacodynamic properties. More particularly, they exhibit very effective, long-lasting coronory dilating properties in warm-blooded animals. In addition, the compounds of the instant invention exhibit hypotensive, spasmolytic and positive inotropic activities in warm-blooded animals; moreover, they protect the heart against oxygen insufficiency and suppress thrombocyte agglutination in warm-blooded animals. Their toxicity values are very low, wherefor their therapeutic ratio is extremely favorable.

For pharmaceutical purposes the compounds of the present invention are administered to warm-blooded animals perorally or parenterally as active ingredients in customary dosage unit compositions, that is, compositions in dosage unit form consisting essentially of an inert pharmaceutical carrier and one dosage unit of the active ingredient, such as tablets, coated pills, solutions, suspensions, capsules, wafers, suppositories and the like. One dosage unit of the compounds of the invention is from 1 to 200 mgm., preferably 5 to 100 mgm.

The following examples illustrate a few dosage unit compositions comprising a compound of the instant invention as an active ingredient. The parts are parts by weight unless otherwise specified.

EXAMPLE 12

Hypodermic solution

The solution is compounded from the following ingredients:

| | Parts |
|---|---|
| 2,7 - dimorpholino - 4-diisopropanolamino-6-(p-tolyl)-pteridine | 10.0 |
| Tartaric acid | 4.0 |
| Polyethyleneglycol 600 | 100.0 |
| Distilled water, q.s. ad, 2000.0 by vol. | |

Compounding procedure: The polyethyleneglycol is admixed with an equal volume of distilled water, the solution is heated to 80° C., and the tartaric acid and the pteridine compound are dissolved therein. The resulting solution is cooled to room temperature, diluted with distilled water to the indicated volume, and filtered until free from suspended particles. The filtered solution is filled into white 2 cc.-ampules, which are then sterilized for twenty minutes at 120° C. and sealed. Each ampule contains 10 mgm. of the active ingredient.

EXAMPLE 13

Coated pills

The pill core composition is compounded from the following ingredients:

| | Parts |
|---|---|
| 2,7-dimorpholino-4-diisopropanolamino-6-(p-tolyl)-pteridine | 30.0 |
| Lactose | 30.0 |
| Potato starch | 16.5 |
| Polyvinylpyrrolidone | 3.0 |
| Magnesium stearate | 0.5 |
| Total | 80.0 |

Compounding procedure: The pteridine compound, the lactose and the potato starch are intimately admixed with each other, and the mixture is moistened with an ethanolic 25% solution of the polyvinylpyrrolidone. The moist mass is forced through a 1.5 mm.-mesh screen, and the resulting granulate is dried at 45° C. The dry granulate is again passed through the screen and is then thoroughly admixed with the magnesium stearate. The finished mixture is pressed into 80 mgm.-pill cores, which are subsequently coated with a thin shell consisting essentially of sugar and talcum. The coated pills are finally polished with beeswax. Each pill weighs approximately 150 mgm. and contains 30 mgm. of the active ingredient.

EXAMPLE 14

Tablets

The tablet composition is compounded from the following ingredients:

| | Parts |
|---|---|
| 2,7 - dimorpholino - 4 - diisopropanolamino-6-(p-tolyl)-pteridine | 60.0 |
| Lactose | 30.0 |
| Potato starch | 23.0 |
| Polyvinylpyrrolidone | 6.0 |
| Magnesium stearate | 1.0 |
| Total | 120.0 |

Compounding procedure: The pteridine compound, the lactose and the potato starch are intimately admixed with each other, and the mixture is moistened with an ethanolic 25% solution of the polyvinylpyrrolidone. The moist mass is forced through a 1.5 mm.-mesh screen, and the resulting granulate is dried at 45° C. The dry granulate is again forced through the screen and is then thoroughly admixed with the magnesium stearate. The finished mixture is pressed into 120 mgm.-tablets, each of which contains 60 mgm. of the active ingredient.

EXAMPLE 15

Gelatin capsules

The capsule filler composition is compounded from the following ingredients:

| | Parts |
|---|---|
| 2,7 - dimorpholino - 4 - diisopropanolamino-6-(p-tolyl)-pteridine | 50.0 |
| Lactose | 60.0 |
| Talcum | 10.0 |
| Total | 120.0 |

Compounding procedure: The pteridine compound is intimately admixed with the lactose and the talcum, and 120 mgm.-portions of the mixture are filled into gelatin capsules of suitable size. Each capsule contains 50 mgm. of the active ingredient.

EXAMPLE 16

Drop solution

The solution is compounded from the following ingredients:

| | | |
|---|---|---|
| 2,7 - dimorpholino - 4 - diisopropanolamino - 6-(p-tolyl)-pteridine | parts | 20.0 |
| Tartaric acid | do | 5.0 |
| Cane sugar | do | 300.0 |
| Sorbic acid | do | 1.0 |
| Flavoring | do | 40.0 |
| Ethanol | parts by vol. | 200.0 |
| Polyethyleneglycol 600 | do | 200.0 |
| Demineralized water, q.s. ad., 1000.0 parts by vol. | | |

Compounding procedure: The sorbic acid is dissolved in the ethanol, an equal volume of deminearalized water is added, and the pteridine compound and the tartaric acid are dissolved therein while stirring (solution A). The cane sugar is dissolved in the remaining amount of demineralized water (solution A). Solution B, the polyethyleneglycol and the flavoring are combined with solution A while stirring, and the combined solution is filtered. 1 cc. (10 drops) of the finished solution contains 20 mgm. of the active ingredient.

EXAMPLE 17

Suppositories

The suppository composition is compounded from the following ingredients:

| | Parts |
|---|---|
| 2,7 - dimorpholino - 4 - diisopropanolamino - 6-(p-tolyl)-pteridine | 100.0 |
| Cocoa butter | 1600.0 |
| Total | 1700.0 |

Compounding procedure: The pteridine compound, in finely pulverized form, is stirred with the aid of an immersion homogenizer into the cocoa butter which had been melted and cooled to about 40° C. The resulting mixture is cooled to 35° C. and is then poured into cooled suppository molds holding 1700 mgm. of the mixture. Each suppository contains 100 mgm. of the active ingredient.

Although the above dosage unit composition examples illustrate only one specific compound of the invention as an active ingredient, it should be understood that any of the other compounds embraced by Formula I may be substituted for the pteridine compound in Examples 13 through 17. Moreover, the amount of active ingredient in these examples may be varied within the dosage unit range set forth above, and the amounts and nature of the inert carrier ingredients may be varied to meet particular requirements.

I claim:

1. A pteridine compound of the formula

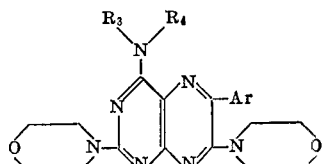

wherein
Ar is pyridyl, chloro-furyl or thienyl,
$R_3$ is alkyl of 1 to 2 carbon atoms or hydroxy-substituted alkyl of 2 to 3 carbon atoms, and
$R_4$ is hydroxy-substituted alkyl of 2 to 3 carbon atoms.

2. A pteridine compound as in claim 1, wherein $R_3$ and $R_4$ are β-hydroxy-n-propyl, and Ar is 5-chloro-2-furyl.

3. A pteridine compound as in claim 1, wherein $R_3$ is γ-hydroxy-n-propyl, $R_4$ is β-hydroxyethyl, and Ar is 3-pyridyl.

4. A pteridine compound as in claim 1, wherein $R_3$ is β-hydroxy-n-propyl, $R_4$ is β-hydroxyethyl, and Ar is 2-thienyl.

5. A pteridine compound as in claim 1, wherein $R_3$ and $R_4$ are β-hydroxy-n-propyl, and Ar is 2-thienyl.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 2,940,972 | 6/1960 | Roch | 260—247.5 |

ALEX MAZEL, Primary Examiner

JOSE TOVAR, Assistant Examiner

U.S. Cl. X.R.

424—248

PO-1050
(5/69)

UNITED STATES PATENT OFFICE
CERTIFICATE OF CORRECTION

Patent No. 3,475,425    Dated October 28, 1969

Inventor(s) JOSEF ROCH

It is certified that error appears in the above-identified patent and that said Letters Patent are hereby corrected as shown below:

Column 5, Example 7 - Formula

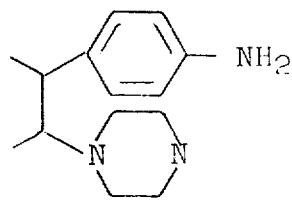    should read

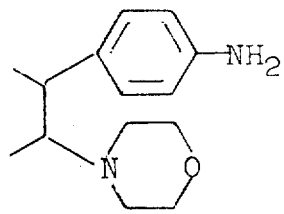

Signed and sealed this 17th day of February 1970.

(SEAL)
Attest:

EDWARD M. FLETCHER, JR.          WILLIAM E. SCHUYLER, JR.
Attesting Officer                Commissioner of Patents